UNITED STATES PATENT OFFICE 2,394,254

THERMOPLASTIC COATING

Thomas Walter Noble, Detroit, Mich.

No Drawing. Application August 12, 1943,
Serial No. 498,417

1 Claim. (Cl. 106—171)

This application discloses a thermoplastic coating, suitable for use as an adhesive coating for paper or the like, and consisting of the following ingredients, combined in the following approximate proportions, by weight:

| | Parts |
|---|---|
| 1. Stearic acid | 55 |
| 2. Ethylcellulose | 20 |
| 3. Paraffin wax | 25 |

The exact proportions are not believed to be critical.

The ethylcellulose that was used successfully in this coating is of the grade having 46 to 50 percent ethoxy content and having a viscosity of 250 cps.

The paraffin wax that was used successfully has an American melting point of 135° Fahrenheit.

The stearic acid is believed to act as a neutral solvent for the other two ingredients. In addition, however, to its function as a liquifying agent, it has some degree of slickness or slip, which is desirable in forming a flexible dry coating suitable as an adhesive on paper.

The ethylcellulose is believed to be the active adhesive.

The wax is believed to impart flexibility to the coating and to render it non-tacky and to give it a high amount of slickness or slip. If the paraffin wax were omitted the coating would be adhesive but would be non-flexible and tacky.

The adhesive coating hereof, when applied to paper, formed a dry, non-tacky, flexible, slick coating. When paper thus coated was applied to another paper, such as waxed paper or regenerated cellulose, with heat and pressure, it adhered to the waxed paper or regenerated cellulose.

Papers coated with the coating hereof have been successfully used as end seals, as for example, the end seals shown at "L" in Fig. 7 of the Schmidt Patent No. 2,201,207, and at 15 in the patent to Hildebrand No. 2,092,916.

Now having described the coating hereof, reference should be had to the claim which follows:

I claim:

A flexible, non-tacky, slick, dry, thermo plastic coating suitable for use as an adhesive coating on paper or the like and useful to cause the paper to adhere to a surface when applied to such surface with the coating in a hot melted condition and permitted to solidify, consisting solely of, by weight, two parts stearic acid, one part ethyl cellulose, and one part paraffin wax, approximately.

THOMAS WALTER NOBLE.